United States Patent
Han et al.

(10) Patent No.: US 7,100,356 B2
(45) Date of Patent: Sep. 5, 2006

(54) HEAT RECOVERY APPARATUS WITH AERODYNAMIC DIFFUSERS

(75) Inventors: Ming Hui Han, Mississauga (CA); Muammer Yazici, Toronto (CA)

(73) Assignee: M & I Heat Transfer Products, Ltd., Mississauga (CA)

( * ) Notice: Subject to any disclaimer, the term of this patent is extended or adjusted under 35 U.S.C. 154(b) by 0 days.

(21) Appl. No.: 11/039,172

(22) Filed: Jan. 20, 2005

(65) Prior Publication Data
US 2005/0120699 A1 Jun. 9, 2005

Related U.S. Application Data

(62) Division of application No. 10/122,479, filed on Apr. 15, 2002, now Pat. No. 6,851,514.

(51) Int. Cl.
*F02C 6/00* (2006.01)
*F02G 1/00* (2006.01)
*F02G 3/00* (2006.01)

(52) U.S. Cl. .................. 60/39.182; 60/39.511; 165/159; 122/7 R (58) Field of Classification Search .......... 60/39.182, 60/39.5, 39.511; 165/159, DIG. 903, 174, 165/145; 122/7 R, 4 D
See application file for complete search history.

(56) References Cited

U.S. PATENT DOCUMENTS

| | | | |
|---|---|---|---|
| 2,916,101 A | | 12/1959 | Naman |
| 2,994,401 A | | 8/1961 | Bourne et al. |
| 3,435,911 A | | 4/1969 | Greenbeck |
| 3,442,324 A | * | 5/1969 | Clay, Jr. et al. ............. 165/283 |
| 3,511,336 A | | 5/1970 | Rink et al. |
| 4,131,432 A | * | 12/1978 | Sato et al. .................. 422/177 |
| 4,387,561 A | * | 6/1983 | Hamilton ..................... 60/781 |
| 4,466,241 A | * | 8/1984 | Inui et al. ................. 60/39.182 |
| 4,478,039 A | * | 10/1984 | Horgan ......................... 60/781 |
| 4,530,311 A | * | 7/1985 | Mantymaki ................. 122/7 R |
| 4,573,551 A | | 3/1986 | Schwedtner et al. |
| 4,748,805 A | * | 6/1988 | Rigault et al. ............... 60/39.5 |

(Continued)

FOREIGN PATENT DOCUMENTS

GB 1423986 2/1976

(Continued)

OTHER PUBLICATIONS

Two pages from a Routeflex brochure including photographs and a description of ROUTEFLEX™ diverter damper (the brochure was published prior to the U.S. filing date).

*Primary Examiner*—William H. Rodriguez
(74) *Attorney, Agent, or Firm*—Gifford, Krass, Groh, Sprinkle, Anderson & Citkowski, P.C.

(57) ABSTRACT

A sound attenuating duct unit suitable for connection to an outlet of a gas turbine and an improved heat recovery apparatus for use with such a turbine are disclosed. The former unit includes a duct housing having exterior sides, an air inlet at one end and first and second air outlets. Interior walls define a main airflow passageway extending from the air inlet to both of the outlets. Sound absorbing and heat insulation material is arranged between these walls and the exterior sides. Sound attenuating members are mounted in the passageway and a diverter damper is mounted in the housing and is able to direct air flow to either one of the air outlets. The sound attenuating members are mounted between the diverter damper and the air inlet. The heat recovery apparatus includes a series of aerodynamic diffusers mounted in a housing adjacent an air flow inlet connectable to the gas turbine.

12 Claims, 7 Drawing Sheets

U.S. PATENT DOCUMENTS

| | | | |
|---|---|---|---|
| 4,901,677 A * | 2/1990 | Demetri | 122/235.17 |
| 4,986,170 A | 1/1991 | Ramakrishnan et al. | |
| 5,140,819 A | 8/1992 | Napier et al. | |
| 5,267,434 A * | 12/1993 | Termuehlen et al. | 60/39.182 |
| 5,431,009 A * | 7/1995 | Bauver, II | 60/39.182 |
| 5,461,853 A * | 10/1995 | Vetterick | 60/783 |
| 5,473,124 A | 12/1995 | Yazici et al. | |
| 5,532,439 A * | 7/1996 | Minkin | 181/224 |
| 5,555,718 A * | 9/1996 | Anderson et al. | 60/783 |
| 5,558,047 A * | 9/1996 | Vetterick | 122/367.1 |
| 5,590,518 A * | 1/1997 | Janes | 60/39.12 |
| 5,592,821 A * | 1/1997 | Alary et al. | 60/751 |
| 5,653,282 A * | 8/1997 | Hackemesser et al. | 165/134.1 |
| 5,728,979 A | 3/1998 | Yazici et al. | |
| 5,861,585 A | 1/1999 | Van Every et al. | |
| 5,946,901 A * | 9/1999 | Bauver et al. | 60/39.182 |
| 6,019,070 A * | 2/2000 | Duffy | 122/209.1 |
| 6,035,964 A | 3/2000 | Lange | |
| 6,289,850 B1 * | 9/2001 | Shimada et al. | 122/7 R |
| 6,298,655 B1 | 10/2001 | Lee et al. | |
| 6,497,199 B1 * | 12/2002 | Yamada et al. | 122/367.1 |
| 6,508,206 B1 * | 1/2003 | Rechtman | 122/7 R |
| 6,920,959 B1 * | 7/2005 | Han et al. | 181/224 |
| 2002/0011065 A1 | 1/2002 | Nishimura et al. | |
| 2002/0174978 A1 * | 11/2002 | Beddome et al. | 165/174 |

FOREIGN PATENT DOCUMENTS

GB      2244804      12/1991

* cited by examiner

HEAT RECOVERY APPARATUS WITH AERODYNAMIC DIFFUSERS

RELATED APPLICATION

This application is a divisional U.S. patent application Ser. No. 10/122,479 filed Apr. 15, 2002 now U.S. Pat. No. 6,851,514.

BACKGROUND OF THE INVENTION

This invention relates to duct units and other devices that can be connected to an air flow outlet of a machine having a rotating axial flow member, for example, a gas turbine and the invention further includes heat recovery apparatus.

The use of large gas turbines for generating electrical power is well known in the power generation art. These large gas turbines can be mounted horizontally in a building or other shelter that provides protection to the turbine against the elements. The outlet for the turbine, through which passes a hot air flow at substantial speed, can be connected to a diffuser duct of cylindrical configuration and then to a transition duct which transforms the hot air outlet passageway from a circular cross-section to a rectangular cross-section. A damper can then be provided, which damper in a first position can direct the hot air flow upwardly through a suitable outlet stack (also referred to as a by-pass stack) which can, in some cases, include some form of silencer arranged in a duct section in order to reduce the level of sound exiting from the stack. If the damper is moved to another position, the hot air can be directed through another pipe section to a heat recovery system, i.e. a heat recovery steam generator. The known heat recovery steam generators can be quite tall and they can include an exterior housing in which is mounted an array of heat exchanging units. Each heat exchanging unit can comprise a series of heat exchanging pipes through which a liquid such as water flows. The flowing water is heated by the hot exhaust gases from the turbine resulting in the generation of steam.

The known hot gas outlet arrangements designed for attachment to the outlet of a gas turbine of the aforementioned type suffer from several disadvantages and deficiencies. For example, the known outlet stack arrangements, even if they are provided with some form of duct silencer, are not very efficient at reducing the level of sound exiting from the gas turbine. One reason for this is that the silencer module, if it is provided at all, may be spaced a substantial distance from the outlet of the gas turbine sound reduction due to the transmission of sound through the walls of the ducts located upstream of the silencer. Also, if the diverter damper is directing the hot air flow into a heat recovery apparatus rather than straight through the by-pass stack, a silencer duct located along the path for the by-pass stack will be useless in reducing the amount of noise generated by the turbine and exiting from the hot air outlet system.

A further substantial difficulty with the known heat recovery apparatus used downstream from a gas turbine is that the hot air from the turbine is not directed evenly over the heat exchanging units which may be mounted in series in a tower-like housing. If the hot air is distributed unevenly, then this will result in uneven heating of the heat exchanging fluid flowing through the heat exchanging units, reducing the efficiency of the heat recovery for the steam generator. Also, uneven hot air distribution in the heat recovery apparatus can result in excessive pressure loss in this apparatus, reducing the gas turbine efficiency.

It is one object of the present invention to provide an improved sound attenuating duct unit suitable for connection to an air flow outlet of a rotating axial flow machine, such as a gas turbine, and able to provide a greater level of sound reduction than is achieved with existing known sound attenuating devices used in combination with such a machine.

It is a further object of the present invention to provide a new sound attenuating duct unit which employs sound attenuating members located between a diverter damper mounted in the duct housing and an air inlet of the duct unit.

It is another object of one aspect of this invention to simplify the silencer modules used in known by-pass stacks and main exhaust stacks, thereby achieving less pressure drop and reducing manufacturing costs.

It is a further object of the present invention to provide a heat recovery apparatus which includes a housing containing an array of heat exchanging units and a series of aerodynamic diffusers adjacent an inlet of the housing, the diffusers acting to redirect a substantial portion of incoming hot air in order that this hot air will pass more uniformly through the heat exchanging units.

It is another object of one aspect of the present invention to provide a new diverter section for a machine having a rotating axial flow member, this section capable of reducing greatly the pressure drop when air passes through it.

SUMMARY OF THE INVENTION

According to one aspect of the invention, a sound attenuating duct unit suitable for connection to an airflow outlet of a machine having a rotating axial flow member includes a duct housing having exterior sides and two opposite ends. An air inlet is located in one of these ends and the housing further includes first and second air outlets with the first air outlet located at the other end of the housing. The air inlet is adapted for connection to the airflow outlet of the machine. Interior walls are arranged in the housing and define a main airflow passageway system which extends from the air inlet to both of the first and second outlets. Sound absorbing material is arranged between the interior walls and the exterior sides of the duct housing and sound attenuating members are mounted in the airflow passageway system. A diverter damper is mounted in the duct housing and is movable between a first position where the damper directs airflow entering through the air inlet to the first air outlet and a second position where the damper directs the air flow to the second air outlet. The sound attenuating members are mounted between the diverter damper and the air inlet so as to reduce the sound levels emitted through either of the air outlets during use of the duct unit.

Preferably the sound attenuating members comprise a series of splitters rigidly mounted in the airflow passageway system and dividing the main air flow passageway system into smaller passageways.

According to another aspect of the invention, a sound attenuating duct unit suitable for connection to an outlet of a stationary gas turbine includes a duct housing having exterior sides, an air inlet in one end of the housing that lies in a first plane, and first and second air outlets with the first air outlet located in one of the exterior sides of the housing spaced from said one end and the second air outlet located in another of the exterior sides that extends in a second plane arranged at a substantial angle to the first plane. The air inlet is adapted for connection to the outlet of a gas turbine in order to receive hot air flow from the turbine. Interior walls are arranged in the housing and define side walls of a main airflow passageway that extends from the air inlet to both of the first and second outlets. Sound absorbing material is arranged between the interior walls and the exterior sides of the housing. A series of sound absorbing splitters are rigidly mounted in the air flow passageway and extend transversely from one side of the main airflow passageway to an opposite side thereof. The splitters divide the main air flow passageway into smaller passageways and contain sound attenuating material capable of withstanding high air flow temperatures of gas turbine exhaust air. A diverter damper is mounted in the duct housing and is movable between a first position where the damper directs the hot air flow to the first air outlet and a second position where the damper directs this hot air flow to the second air outlet. The series of splitters are mounted between the diverter damper and the air inlet so that the hot air flow exiting from the smaller air passageways flows to a selected one of the first and second air outlets.

Preferably this duct unit includes a central air flow defining member rigidly mounted in the housing and extending inwardly from the air inlet to the series of splitters.

According to a further aspect of the invention, a heat recovery apparatus includes a housing having exterior walls, a hot airflow inlet and an airflow outlet. An array of heat exchanging units is mounted in this housing, each heat exchanging unit being adapted for heat exchange between a hot air flow and a heat exchanging liquid flowing through pipes of the heat exchanging unit. A series of aerodynamic diffusers are mounted in the housing adjacent the air flow inlet. The aerodynamic diffusers redirect at least a substantial portion of hot air flow entering the housing through the air flow inlet during use of the apparatus in order that the hot air flow passes more uniformly through the heat exchanging units.

Preferably the aerodynamic diffusers extend horizontally and are arranged one above another.

Further features and advantages will become apparent from the following detailed description of the various aspects of the invention, taken in conjunction with the accompanying drawings.

DETAILED DESCRIPTION OF PREFERRED EMBODIMENTS

Figure 1:
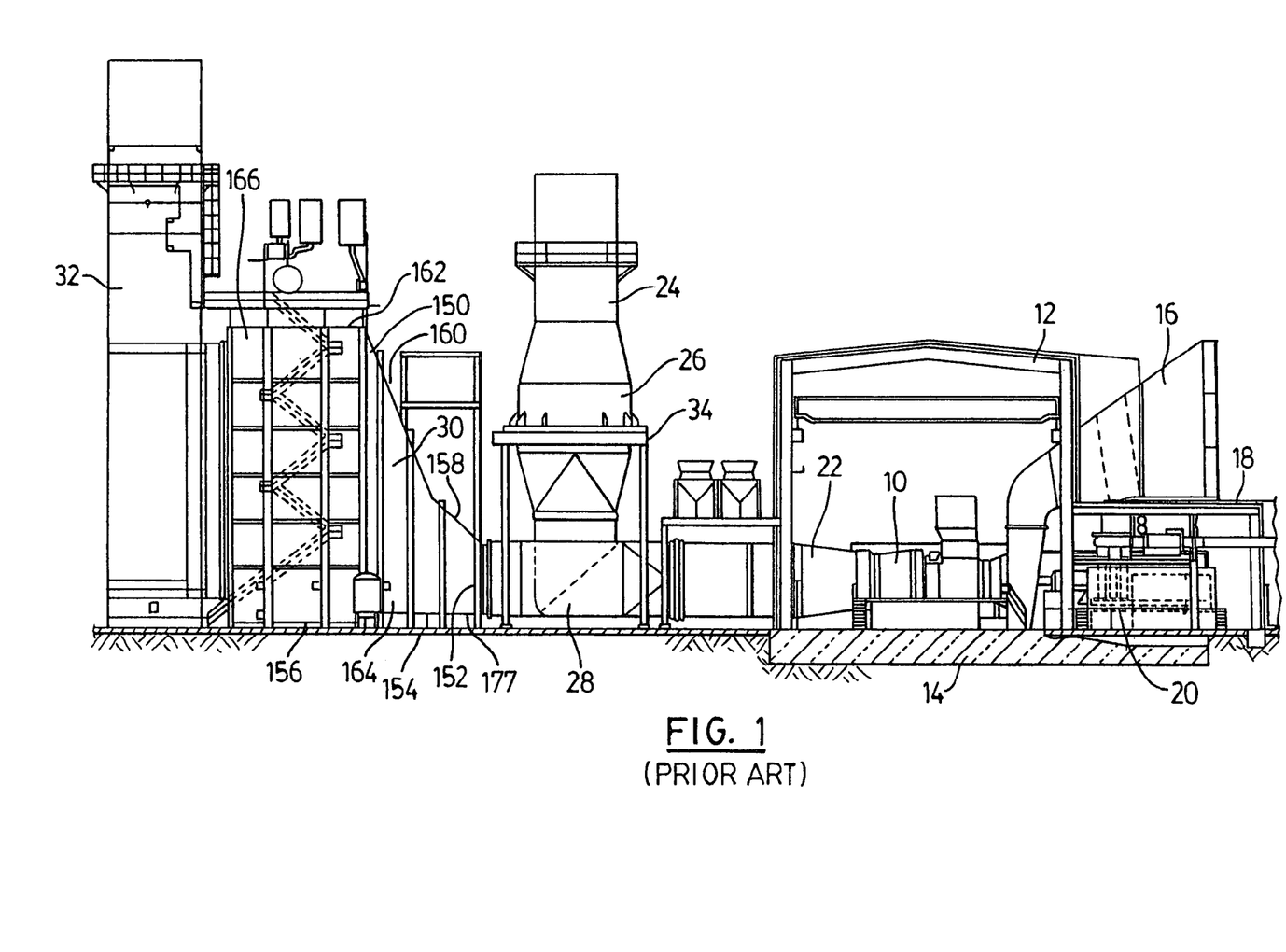
FIG. 1 is a schematic elevation of a known system for generating power by means of a large gas turbine mounted horizontally in a protective structure, the illustrated system including a pair of outlet stacks and a heat recovery steam generator.

Illustrated in FIG. 1 is a schematic view of an electrical power generating system employing a large, stationary gas turbine 10. The gas turbine can be of standard construction and it can be protected by means of a building or structure 12. The turbine can be rigidly mounted on a thick concrete pad 14. Intake air for the turbine is drawn in through an air intake filter arrangement 16 which can be mounted on a suitable support frame 18. Arranged below the filter arrangement 16 is a gas turbine generator 20 which can be fitted with a suitable generator circuit breaker. A circular hot air outlet for the turbine is located at 22. Connected downstream of the turbine outlet is a bypass stack 24 through which the hot exhaust gases from the turbine can be passed, if required or appropriate. As explained further below, this stack can contain a duct silencer located in duct section 26 which has an enlarged horizontal cross-section. Located below the section 26 is a by-pass stack module 28 which is open on its right side (as seen in FIG. 1) for inflow of the hot exhaust gases from the turbine. There can be arranged in this module a diverter damper of known construction which can be moved from a first position wherein the damper forces the air flow to pass upwardly through the bypass stack to a second position where the damper allows the hot exhaust gases to flow into a heat recovery steam generator 30. As explained further hereinafter, the heat recovery section contains an array of heat exchanging units in which a fluid such as water flows for purposes of heat exchange with the hot exhaust gases from the gas turbine. Also shown in FIG. 1 is an exhaust gas stack 32 of known construction and it is through this stack that exhaust air of reduced temperature eventually exits to atmosphere after passing through the heat recovery steam generator. The bypass stack 24 is shown supported by a steel supporting framework 34 that extends upwardly from the ground.

Figure 2:
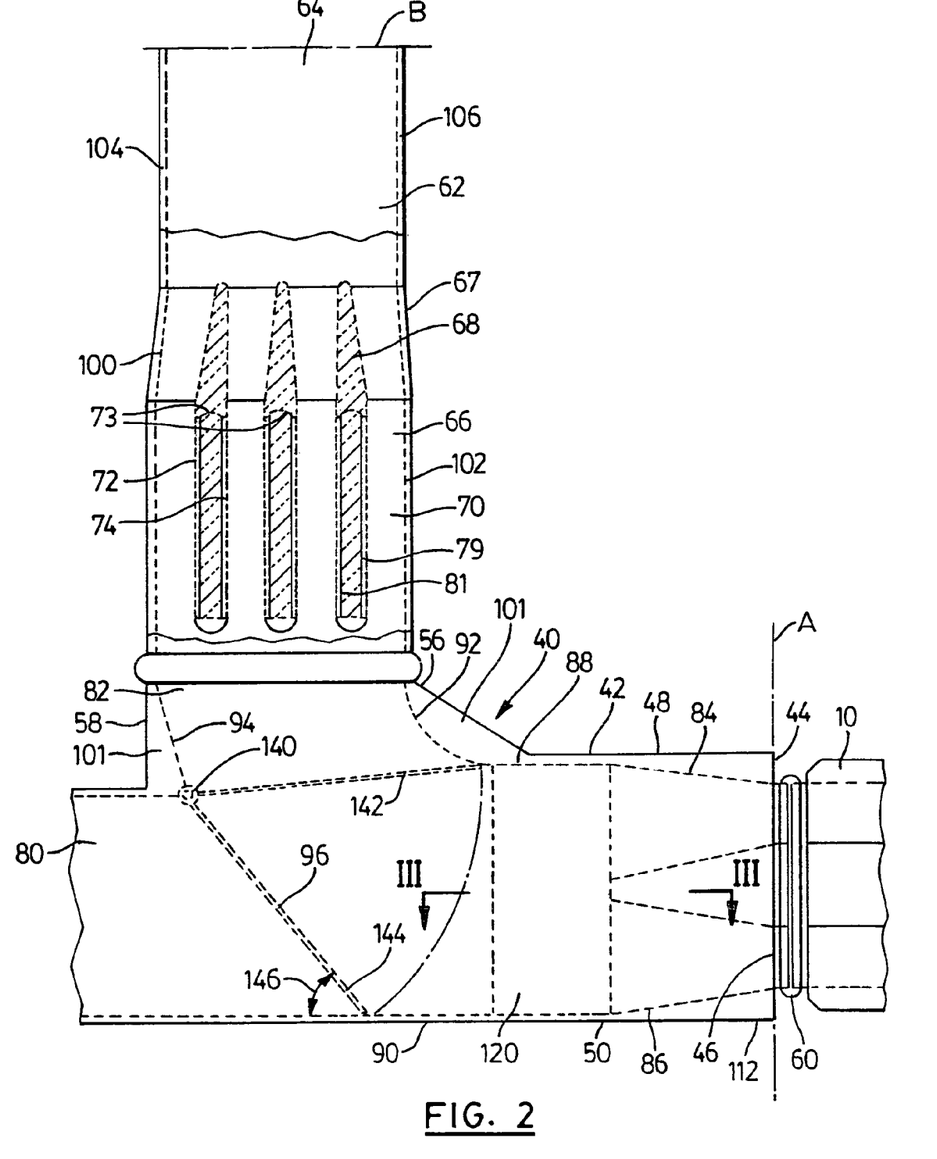
FIG. 2 is a side elevation of a sound attenuating duct unit constructed in accordance with the invention, this view also illustrating a section of a by-pass stack.

FIG. 2 illustrates an improved sound attenuating duct unit 40 constructed in accordance with the invention which can be used in place of the prior art airflow outlet arrangement illustrated in FIG. 1, that is, in place of the known duct structure that is connected to the outlet of the gas turbine, including the bypass stack module 28. The duct unit 40 is suitable for connection to an airflow outlet of not only a gas turbine but other machines having a rotating fan or axial flow member that generates a significant amount of noise. The duct unit 40 includes a duct housing 42 having exterior sides and two opposite ends including an end 44 wherein an air inlet indicated at 46 is provided. The exterior sides of the housing can be constructed of suitable metal plates such as mild steel or stainless steel plates. The illustrated exterior sides include a horizontal top 48, a bottom 50 and two vertically extending side walls 52 and 54 (see FIG. 3). There is also a sloping wall 56 that is connected along its lower edge to the top 48 and there is a vertical side wall 58 located opposite the wall 56. Preferably mounted next to the end 44 of the duct housing is an expansion joint 60 which per se can be of known construction.

The duct unit of the invention can include a bypass stack section 62, the upper portion of which is not shown in FIG. 2 for ease of illustration. The upper end of this stack terminates in an air outlet 64 where the hot air flow from the gas turbine can exit to atmosphere. The upper portion of the by-pass stack section 62 is preferably of circular cross-section and, if it is, there can be a transition section 67 whose horizontal cross-section changes from rectangular (or square) to circular. As indicated above, the bypass stack can include a wider section (of rectangular, horizontal cross-section) provided for sound attenuation. In the embodiment of FIG. 2, this wider section is indicated at 66 and it can include a plurality of splitter members 68 which individually can be of known construction. These splitter members can extend from one inner side wall of the section 66 to the opposite inner side wall and they divide the main airflow passageway into a series of smaller, parallel passageways 70 which can be as few as four (or less) as shown. In a known manner, these splitters are preferably made with perforated sheet metal panels 72, 74. These splitter members are preferably filled with sound attenuating material that is able to withstand the high temperatures of the hot air flow passing through the section 66. An optional feature of the splitter members 68 is a layer of stainless steel screen 79, 81 which is arranged behind the perforated sheet metal, this screen helping to prevent the escape of the sound attenuating material through the holes in the perforated sheet metal. Instead of using this metal screen, it is also possible to encapsulate the sound attenuating material in woven fiber bags in a manner known per se. If the upper portion of the by-pass stack is circular in cross-section, then the splitters 68 are located only in the wider section 66 and they preferably do not extend into the transition section 67. This is indicated by the curved ends indicated at 73 in dash lines.

The illustrated duct unit of FIG. 2 also has another air outlet located generally at 80. The outlet 80 can be considered as located at the other or second end of the duct housing, that is the end opposite the aforementioned end 44. The air outlet 64, sometimes herein referred to as the second air outlet, can be considered as located in a plane indicated at B which, in the illustrated duct unit of FIG. 2, extends horizontally. The aforementioned air inlet 46 lies in a first plane indicated by the dash line A in FIG. 2 and it will be seen that the plane B lies at a substantial angle to the first plane A. As illustrated, this substantial angle is 90 degrees.

The duct unit 40 of the invention also has interior walls arranged in the duct housing 42 and it is these interior walls which define main airflow passageway system 82, a system which extends from the air inlet 46 to both of the first and second outlets. The interior walls shown in FIG. 2 include upper and lower transition wall sections 84, 86, flat upper wall 88 and lower interior wall 90. The wall 90 extends from transition wall 86 to the first air outlet 80 while upper wall 88 extends from the transition wall 84 to an arc-shaped interior wall section 92 which curves upwardly to the duct section 66. A planar interior wall section 94 extends upwardly at a small acute angle to a vertical plane from a diverter damper 96 to the vertically extending duct section 66. All of these interior walls are preferably made of perforated stainless steel sheet metal of suitable composition and of sufficient thickness (gauge) to withstand high temperature air flows. It is also possible to construct these interior walls of solid sheet metal (imperforate metal). At least the attenuator section 66 can also be constructed with perforated interior walls indicated at 100 and 102. It will be appreciated that these perforated interior walls can be on all four sides of the attenuator section 66. If desired, the perforated interior walls can extend upwardly along the upper portion of the bypass stack as indicated at 104 and 106 in FIG. 2. It will be understood that located between these interior perforated walls and the exterior walls is suitable sound absorbing and thermal insulation material 101 which not only reduces significantly the volume of sound coming from this duct unit but also serves to insulate the exterior walls of the duct housing from the hot gases flowing through the passageway. The use of perforated sheet metal in the upper portion of the bypass stack will depend upon the particular job requirements and, in particular, the amount of sound reduction required at the job site. It will be appreciated by those skilled in the art that it may not be necessary for the perforated interior walls to extend the entire height of the bypass stack in order to obtain the desired sound attenuation.

Figure 3:
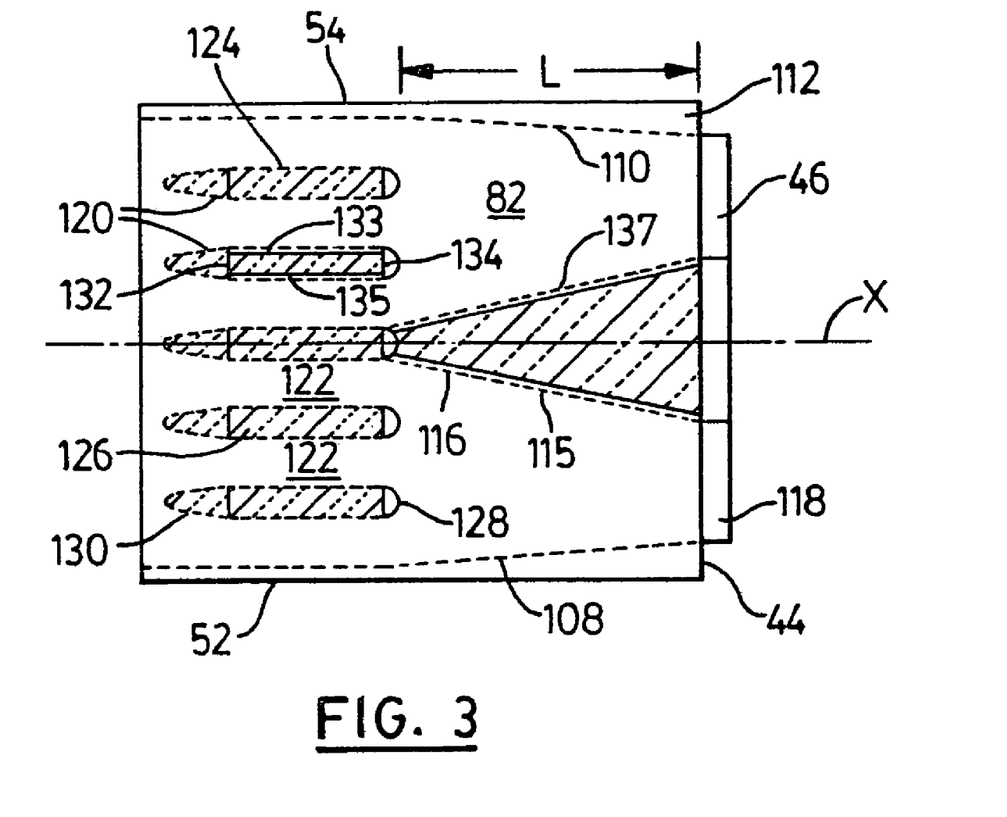
FIG. 3 is a horizontal cross-section taken along the line III—III of FIG. 2, this view showing splitters arranged in the duct section.

FIG. 3 illustrates additional, vertically extending interior walls 108, 110 which can also be perforated and made of stainless steel. The interior walls 108, 110 extend through a duct transition section 112. These interior walls 108, 110 could also be made of solid (imperforate) sheet metal, if desired. It will be understood that in this section, the length of which is indicated as L in FIG. 3, the transverse cross-section of the main airflow passageway 82 changes from circular to square or rectangular.

In this transition section, there is preferably located a central airflow defining member 115 which is rigidly mounted in the duct transition section 112 and which extends inwardly from the air inlet at 46. This airflow defining member has a central longitudinal axis indicated at X which extends through the centre of the air inlet 46. The exterior of this central airflow defining member is made with strong, perforated sheet metal suitable for high temperature conditions, such as stainless steel. This sheet metal exterior 116 preferably forms a truncated cone as shown in FIG. 3 with the member tapering inwardly in the direction of the hot air flow. The interior of this air flow defining member 115 is filled with sound attenuating material which must be capable of withstanding the hot temperatures of the air flow rushing past its sheet metal exterior. In general, the sound attenuating material must be capable of withstanding airflow temperatures of gas turbine exhaust air, which can be higher than 500° C., and the preferred sound attenuating material is ceramic fiber or mineral wool. In order that the perforated sheet metal of the airflow defining member 115 can withstand these high temperatures for prolonged periods, the sheet metal should have a thickness of at least 12 gauge. By using this thicker gauge, the perforated sheet metal will not bend and distort when its temperature becomes elevated and subjected to stresses and other forces acting thereon. This applies to all interior surface materials used where high temperatures may be created. It should also be noted that the metal components in the duct unit that are exposed to the hot air stream should be constructed so as to allow for quick expansion when exposed to high temperature gradients within a few seconds of turbine start up. Also shown in FIG. 3 is a short, connecting flange 118 used to connect the end 44 of the duct unit to the expansion joint 60 at the outlet of the gas turbine. An optional feature of the airflow defining member is the use of a layer 137 of stainless steel screen arranged behind the perforated sheet metal to prevent the escape of the sound attenuating material through the holes in the perforated sheet metal.

Located downstream of the airflow defining member 115 and close to or next to this member are a series of so-called splitters 120 which are sound attenuating members and which are rigidly mounted in the airflow passageway system. These splitters divide the main air flow passageway 82 into smaller passageways 122. Each of these splitters also has an exterior formed of perforated sheet metal indicated at 124 and each splitter is filled with sound attenuating material 126. In the preferred embodiment illustrated in FIG. 3, there are five evenly spaced splitters with the central splitter aligned with the central axis X of the airflow defining member 115. It will be understood that each splitter extends from one interior side wall of the main airflow passageway 82 to the opposite interior side wall and, although the illustrated splitters extend vertically, it is also quite possible for the splitters to extend instead in a horizontal direction.

Preferably, each splitter 120 has a semi-cylindrical nose section 128 which can be made of imperforate metal. A tail section 130 of each splitter is tapered in the direction of the air flow and this section can be made of perforated metal. In order to provide improved structural integrity for each splitter, there can be internal partitions or supporting members 132, 134. Like the airflow defining member 115, the splitters should also be constructed so that they are capable of withstanding high temperatures of gas turbine exhaust air which can be higher than 500° C. Thus, sound attenuating material filling each splitter is preferably heat resistant material such as mineral wool or ceramic fiber. The gauge of the sheet metal used to form the exterior of each splitter is preferably 12 gauge. Again an optional feature of these splitters is the use of a layer of stainless steel screen 133, 135 arranged directly behind the perforated sheet metal to prevent the escape of the sound attenuating material. For ease of illustration the use of the screens 133, 135 is shown in only one of the splitters 120 but it will be understood that these layers can be used in all of these splitters.

In accordance with this aspect of the invention, the sound attenuating members or splitters 120 are mounted between the diverter valve or damper 96 and the air inlet 46. Due to the location of the sound attenuating members, they are capable of providing a substantial reduction of the sound levels emitted through either of the air outlets during use of this sound attenuating duct unit.

As a result, silencer modules in the by-pass stack section and/or the main exhaust stack can be simplified by using a larger space between adjacent splitters or by even eliminating splitters. This reduces the pressure drop across the sound attenuating members in the exhaust system, reduces manufacturing costs, and reduces maintenance expenditures.

The preferred form of the diverter damper 96 is illustrated schematically in FIG. 2. The preferred damper comprises a large, planar, rectangular or square metal flap constructed to withstand the hot air flow temperatures passing by the damper. The preferred metal for this purpose is stainless steel, for example, type 409 stainless steel. It will be understood by those skilled in the art of constructing such diverter valves that sheet metal forming the exterior of the damper can be reinforced or strengthened by suitable supporting frame members that are covered by the sheet metal. A detailed description of the construction of the pivoting damper itself herein is deemed unnecessary as dampers of this general type are known in this art. For example, a diverter damper of this type is sold by Mannesmann Seiffert under the trademark ROUTEFLEX. This known diverter damper is pivoted about a horizontal axis by means of an internal toggle link lever drive connected to one side of the pivoting damper member.

The damper 96 pivots about its upper or rear edge on a pivot shaft 140, the ends of which are mounted in the sides of the duct unit. Although the actual mechanism for pivoting the large damper 96 is not shown, it will be appreciated that any suitable known mechanism for pivoting a large damper can be used provided it has sufficient strength and it does not interfere unduly with the hot air flow through the airflow passageway in either position of the damper. The illustrated damper 96 is movable between a first position indicated by dash lines at 142 in FIG. 2 where the damper directs airflow entering through the air inlet to the first air outlet 80 and a second position shown in solid lines at 144 where the damper directs the air flow to the second air outlet 64. It will be seen from FIG. 2 that the diverter damper in the first position 142 extends substantially horizontally, permitting the hot airflow from the turbine to flow directly and without a significant change in direction to the outlet 80 where this air flow can pass into a heat recovery unit. In the second position, the damper extends at a substantial acute angle indicated at 146 to a horizontal plane. Because of the slope of the damper or flap and because of the integration of sloping wall section 94 and the curved interior surface of wall section 92, the damper is able to smoothly direct or turn the hot air flow in an upwards direction to permit this air flow to pass smoothly through the splitter members 68 and eventually through the outlet 64. Thus the slope of the damper and the slope of the wall sections provides a smoother flow and thus a lower pressure drop than conventional dampers.

Figure 4:
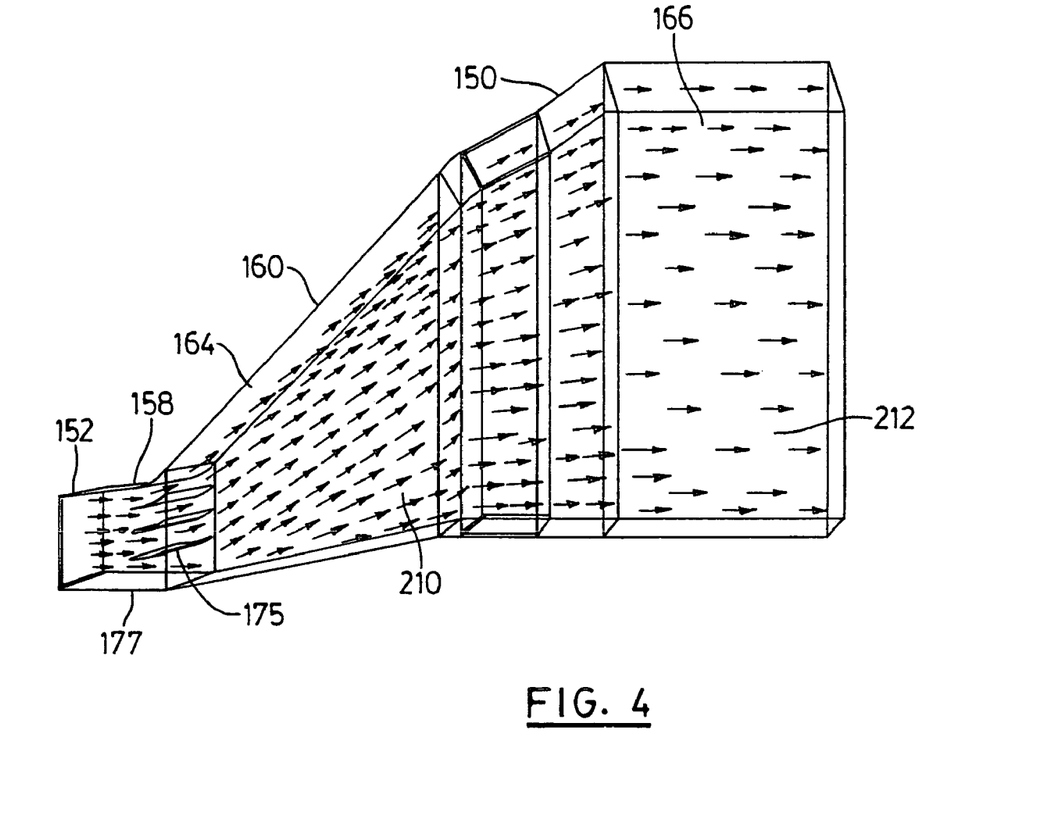
FIG. 4 is a velocity profile illustrating the advantage of turning vanes in a heat recovery apparatus such as a heat recovery steam generator, this view illustrating the uniform low velocity air passing through the region where heat exchanging units would be located.

Turning now to a further aspect of the present invention and with initial reference to FIGS. 1 and 4 of the drawings, the invention also provides an improved heat recovery apparatus that can be used downstream of the aforementioned air outlet 80. Except for the differences in construction noted herein, this heat recovery apparatus can be constructed in the same manner as the heat recovery steam generator 30 illustrated in FIG. 1. This apparatus includes a housing 150 (shown only schematically in FIG. 4) having exterior walls, a hot airflow inlet 152 and an airflow outlet such as the aforementioned exhaust gas stack 32. The exterior walls of the housing can include horizontal bottom walls 154, 156, sloping top walls 158, 160 and horizontal top wall 162. Extending between these bottom and top walls are vertical side walls or side panels 164 and 166. In a known manner, this housing 150 contains an array of heat exchanging units (shown in FIG. 8) which are rigidly mounted therein. Each heat exchanging unit is adapted for heat exchange between the hot air flow that enters through the inlet 152 and a heat exchanging liquid, i.e. water, flowing through pipes of the heat exchanging unit. A significant problem with the known heat recovery steam generators of the past that are constructed in this manner is that the hot air flow is simply allowed to flow freely into the large, vertically extending housing containing the heat exchanging units. The result is an uneven distribution of the hot air flow as it passes through the heat exchanging units. In particular, a major portion of the hot air flow simply flows directly through the lower heat exchanging units with a substantially lesser amount of hot air flow passing through the upper heat exchanging units of the array. This uneven distribution, of course, results in inefficient heat recovery and can further result in a shortened working life for the heat recovery apparatus because of premature failure of pipes and other parts conducting and carrying the heat exchanging fluid, as well as turbulent flow induced fatigue failure of the inner walls of the transition plenum.

Figure 5:
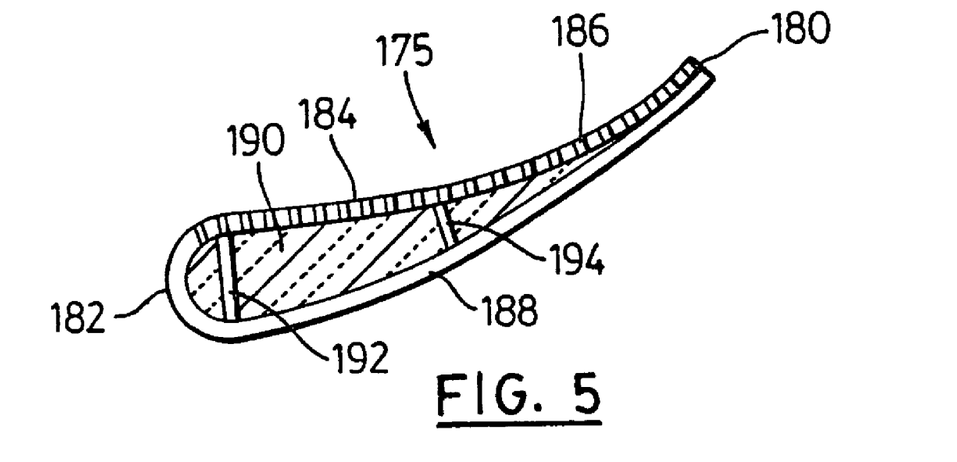
FIG. 5 is a vertical cross-section of an aerodynamic diffuser or turning vane that can be used in the heat recovery apparatus of the invention.

The aforementioned difficulty is substantially alleviated in the present invention by the use of aerodynamic diffusers 175, three of which are shown in FIG. 4 and one of which is shown separately in FIG. 5. These aerodynamic diffusers are mounted in the region of the airflow inlet 152 and they are preferably mounted one above the other as shown. The number of these diffusers can vary depending upon the size of the heat recovery apparatus and the particular requirements for airflow redirection. As illustrated, these diffusers can be located in a relatively short duct section 177 having a horizontal bottom wall and an upwardly sloping top wall 158. It will be understood that these aerodynamic diffusers redirect at least a substantial portion of the hot air flow coming from the turbine and entering the housing through the inlet 152 during use of the heat recovery apparatus in order that the hot air flow passes more uniformly through the heat exchanging units. Preferably these aerodynamic diffusers 175 extend horizontally as shown and they extend from one side wall of the duct section to the opposite side wall. The diffusers 175 and their connections to the side walls are constructed in a manner known per se so as to allow for quick expansion when they are exposed to high temperature gradients within a few seconds of turbine start-up. The duct section in which the diffusers are mounted can be considered a transition duct portion of the housing as it provides a transition from the lower outlet 80 of the above described sound attenuating duct unit to the relatively large, vertically extending housing that contains the heat exchanging units.

At least a majority of the aerodynamic diffusers 175 are curved as shown in the drawings from their leading edges 182 (see FIG. 5) to the rear ends 180 with each diffuser forming a concave curve indicated at 184 on a top side thereof.

Turning now to one preferred embodiment of the diffuser 175 as illustrated in FIG. 5, the illustrated diffuser 175 also provides acoustical treatment or sound attenuation in order to reduce the level of sound passing through the heat recovery apparatus. Thus, in this embodiment, the curved upper surface of the diffuser is made of perforated sheet metal stainless steel indicated at 186. It will be seen that this diffuser has a double wall construction and the bottom surface of the diffuser can be made with solid stainless steel sheet metal indicated at 188. Between the two curved walls is suitable sound attenuating material 190 which can fill the interior space of the diffuser. As the hot air passing by these diffusers can still be at elevated temperatures of 500° C. or more, the preferred sound attenuating material is mineral wool because of its low cost and ability to withstand high temperatures. Other possible sound attenuating materials include ceramic fibers and silica fibers but these materials are more expensive.

Figure 6:
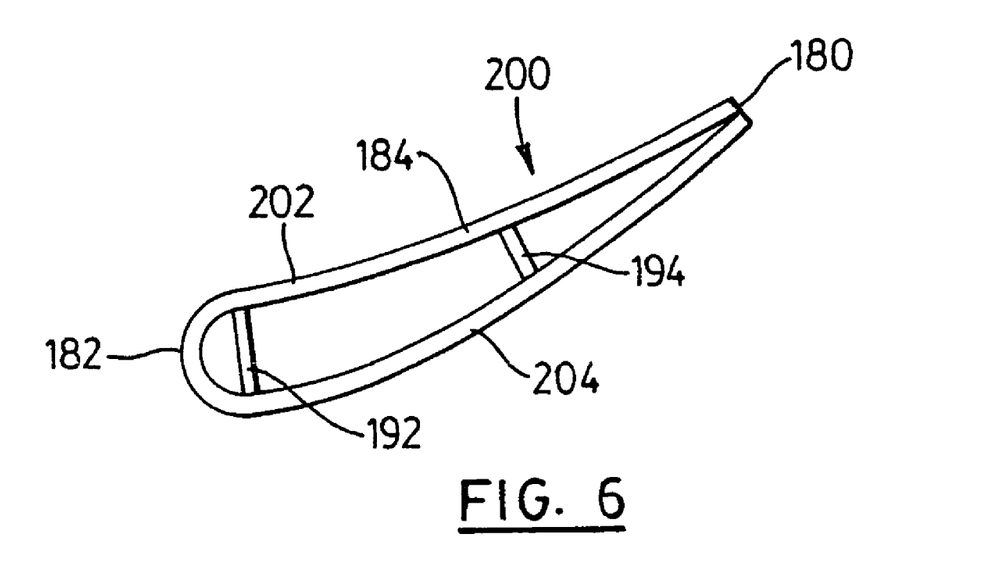
FIG. 6 is a vertical cross-section of another form of aerodynamic diffuser that can be used in the heat recovery apparatus.

The leading end of the diffuser can have a semi-cylindrical shape as shown in FIGS. 5 and 6. Brace plates or connecting plates 192, 194 can extend between the two curved walls forming the diffuser and these help to provide the correct spacing between the walls for good performance.

Where sound attenuation by the diffusers is not required, a diffuser of the type illustrated in FIG. 6 can be used. This diffuser 200 does not contain any sound attenuating material and both the upper curved panel 202 and the lower curved panel 204 are made of solid stainless steel sheet metal. Except for these differences, this aerodynamic diffuser can be the same in its construction and in its mounting as the diffuser 175.

With the use of the turning vanes or aerodynamic diffusers of this invention, the present heat recovery apparatus has the advantage of low back pressure in the region of the air flow inlet 152 and the diffusers located a short distance downstream of this inlet. A low pressure drop is advantageous from an efficiency standpoint and it is achieved by reason of the good aerodynamic design.

Figure 7:
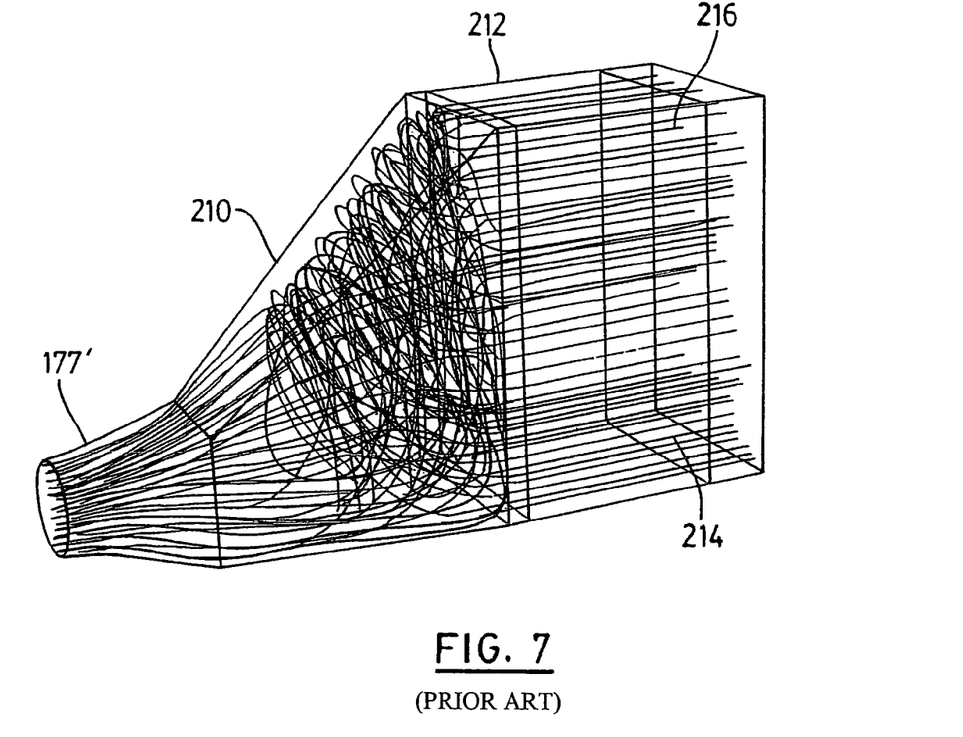
FIG. 7 is a schematic illustration of airflow patterns common in a prior art heat recovery apparatus.

FIG. 7 illustrates the airflow pattern through the heat recovery steam generator if no aerodynamic diffusers or turning vanes are provided. Although the hot air flows reasonably smoothly and in one direction through the transition duct section 177', the air flow in the much larger transition section 210 is quite turbulent and virtually is in all directions. This is due to the fact that the hot air flow is simply dumped into the much larger transition space or transition passageway formed by the transition section 210. Then, as the hot air flow enters the large box-like housing section 212 wherein heat exchanging units (not shown) are located, the air flows tend to be parallel and horizontal as shown but the amount of air flow passing through each level of this section varies substantially in practice with much more hot air passing through the lower levels indicated at 214 than through the upper levels indicated at 216.

FIG. 4 illustrates what occurs when aerodynamic diffusers constructed in accordance with the invention are provided, it will be seen that the air flow through the large transition section 210 is more evenly distributed over the expanding height of this section and is much less turbulent. The result is a more uniform distribution of the hot air flow through the section 212 in which the heat exchanging units are located.

In a particularly preferred embodiment, the heat exchanging units in the section 212 are in the form of heat recovery steam generating coils through which water passes and is heated for steam creation.

An additional advantage that is achieved through the use of the present aerodynamic diffusers and that arises from the more uniform air flow distribution across the heat exchanging units is the elimination or reduction of vibrations in the heat exchanging units or on the inside walls of the transition section 210, which can otherwise be created. It will be appreciated that in the case where there is excessive hot air flow through the lower sections of the heat exchanging units, this air flow, which can be of a fairly high velocity, can create vibrations in the lower heat exchanging units.

Also, turbulent airflow can be generated inside the transition section 210 if the aerodynamic diffusers are not used. This type of airflow can produce induced vibration on the inner walls of the section 210 and can result in premature fatigue failure of the liner material and its support structure.

Figure 8:
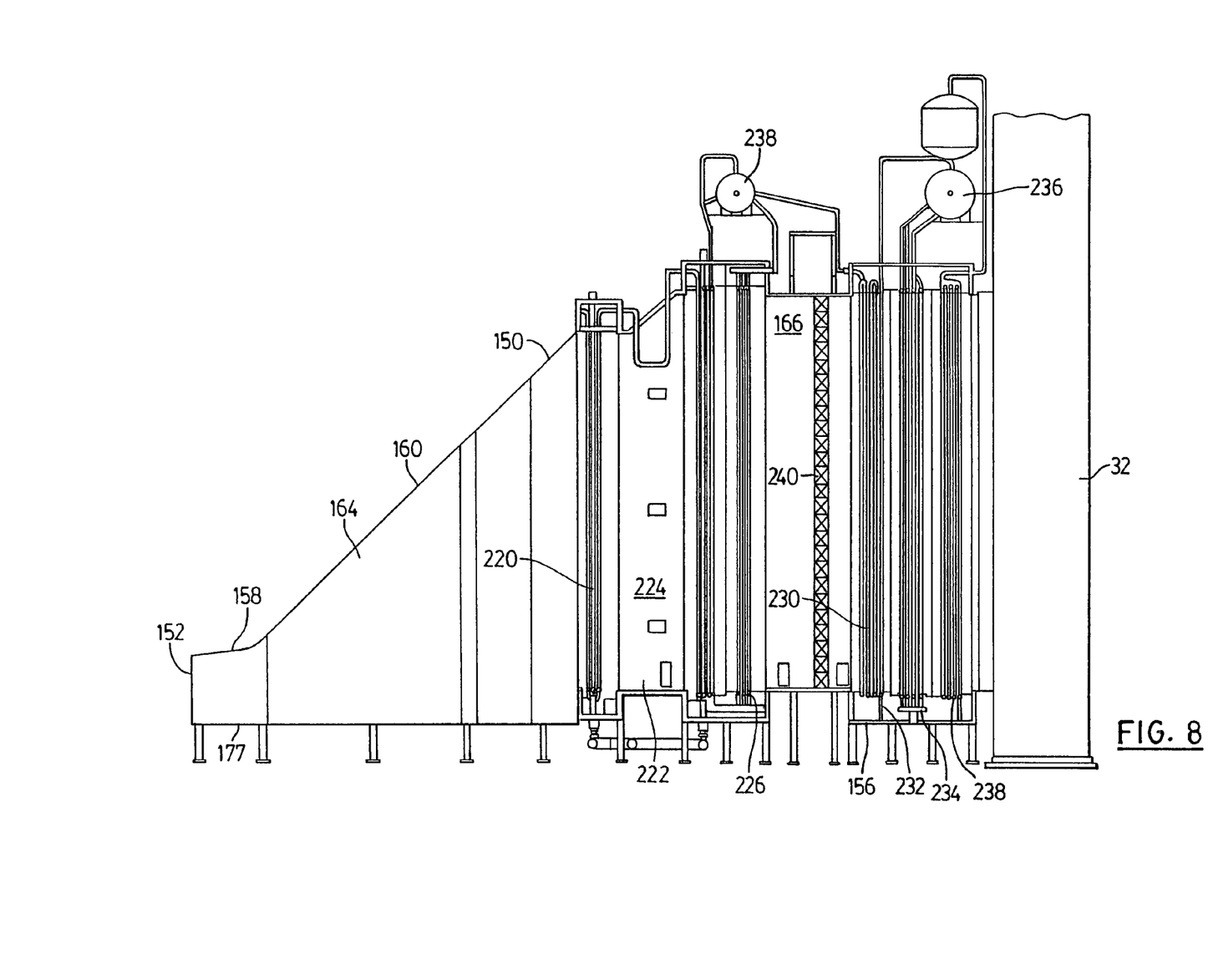
FIG. 8 is a schematic side elevation of a typical heat recovery steam generator which can use the aerodynamic diffusers of FIG. 5 or FIG. 6, this view being partly in vertical cross-section in the regions of the heat exchanging units in order to illustrate same.

FIG. 8 illustrates a typical known heat recovery steam generator in which the series of aerodynamic diffusers (described above) can be used. As illustrated, the steam generator includes a high pressure superheater 220 which comprises an array of heat exchanging units in the form of pipes through which water flows. The water, which is a heat exchanging liquid, is heated by the hot gases to generate steam. A duct burner 222 and burner outlet duct 224 can be provided next to the superheater 220 on the downstream side. Moving to the right in FIG. 8, the hot gas flow then can pass through a high pressure evaporator 226. Shown on top of the housing and directly above the evaporator 226 is a high pressure drum 228 while downstream of the evaporator and extending the height of the housing is a high pressure economizer 230 which also comprises heat exchanging units.

Between the economizer 230 and the stack 32 is a low pressure section of the steam generator. This section can include a low pressure superheater 232, a low pressure evaporator 234 and a low pressure drum 236 mounted on top of the housing. Mounted above the drum 236 is an integral deaerator. Arranged between the evaporator 234 and the stack is a feedwater heater 238 that extends the height of the housing as shown. Also illustrated in FIG. 8 is a selective catalytic reducer 240 located between the high pressure evaporator 226 and the high pressure economizer 230. Although one form of heat recovery steam generator has been illustrated in FIG. 8, clearly other forms and other versions of such steam generators are well known in the steam generator art and the use of the present invention is not limited to the particular steam generator that has been illustrated.

It will be understood by those skilled in the art that various modifications and changes can be made to both the sound attenuating duct unit and the heat recovery apparatus as described above without departing from the spirit and scope of this invention. Accordingly all such modifications and changes as fall within the scope of the appended claims are intended to be part of this invention.

The invention claimed is:

1. A heat recovery apparatus comprising:
    a housing having exterior walls, a hot airflow inlet, and an airflow outlet;
    an array of heat exchanging units mounted in said housing, each heat exchanging unit being adapted for heat exchange between a hot air flow and a heat exchanging liquid flowing through pipes of the heat exchanging unit; and
    a series of aerodynamic diffusers mounted in said housing in the region of the airflow inlet, a leading end of each diffuser relative to the direction of hot airflow in said housing during use of the apparatus having a rounded shape as seen in vertical cross-section, each diffuser having a leading front section which is wider than a rear end thereof, and said diffusers being mounted in a transition duct portion of said housing,
    wherein said aerodynamic diffusers redirect at least a substantial portion of hot air flow entering said housing through said airflow inlet during use of said apparatus in order that said hot air flow passes more uniformly through said heat exchanging units.

2. A heat recovery apparatus according to claim 1 wherein said aerodynamic diffusers extend horizontally and are arranged one above another.

3. A heat recovery apparatus according to claim 2 wherein said aerodynamic diffusers extend from one interior wall of said transition duct portion to an opposite interior wall.

4. A heat recovery apparatus according to claim 1 wherein at least a majority of said aerodynamic diffusers are each curved from their leading edges to their rear ends with each diffuser forming a concave curve on a top side thereof.

5. A heat recover apparatus according to claim 1 in combination with a gas turbine usable for power generation, wherein an outlet of said turbine is connected to said airflow inlet.

6. A heat recovery apparatus according to claim 1 wherein said housing and said array of heat exchanging units together provide a heat recovery steam generator system.

7. A heat recovery apparatus according to claim 4 wherein each diffuser is formed with upper and lower stainless steel sheet metal panels, each upper panel is made with perforated sheet metal, and each diffuser is filled with sound attenuating material.

8. A heat recovery apparatus according to claim 4 wherein each diffuser is formed with upper and lower stainless steel sheets which are both imperforate.

9. A heat recovery apparatus comprising:
    a housing having exterior walls, a hot airflow inlet, and an airflow outlet;
    an array of heat exchanging units mounted in said housing, each heat exchanging unit being adapted for heat exchange between a hot air flow and a heat exchanging liquid flowing through pipes of the heat exchanging unit; and
    a series of aerodynamic diffusers mounted in said housing in the region of the airflow inlet, at least a majority of said aerodynamic diffusers each being curved from their leading edges to their read ends relative to the direction of hot airflow in said housing during use of the apparatus, each diffuser forming a concave curve on a top side thereof, wherein said aerodynamic diffusers redirect at least a substantial portion of hot air flow entering said housing through said airflow inlet during use of said apparatus in order that said hot air flow passes more uniformly through said heat exchanging units.

10. A heat recovery apparatus according to claim 9 wherein said aerodynamic diffusers are rigidly mounted in a transition duct portion of said housing and extend from one interior wall thereof to an opposite interior wall.

11. A heat recovery apparatus according to claim 10 wherein each diffuser is formed with upper and lower stainless steel sheet metal panels, each upper panel is made with perforated sheet metal, and each diffuser is filled with sound attenuating material.

12. A heat recovery apparatus according to claim 10 wherein each diffuser is formed with upper and lower stainless steel sheets which are both imperforate.

* * * * *